(12) United States Patent
Franco et al.

(10) Patent No.: US 10,007,532 B1
(45) Date of Patent: Jun. 26, 2018

(54) DATA INFRASTRUCTURE FOR CROSS-PLATFORM CROSS-DEVICE API INTER-CONNECTIVITY

(71) Applicants: Aaron Gerard Franco, Brooklyn, NY (US); Gabriel Joshua Ortiz, London (GB); Ian Carlyle Morrison, Hailsham (GB)

(72) Inventors: Aaron Gerard Franco, Brooklyn, NY (US); Gabriel Joshua Ortiz, London (GB); Ian Carlyle Morrison, Hailsham (GB)

( * ) Notice: Subject to any disclaimer, the term of this patent is extended or adjusted under 35 U.S.C. 154(b) by 0 days. days.

(21) Appl. No.: 15/478,208

(22) Filed: Apr. 3, 2017

Related U.S. Application Data

(63) Continuation of application No. 14/347,629, filed as application No. PCT/US2012/049230 on Aug. 1, 2012, now Pat. No. 9,614,901.

(60) Provisional application No. 61/513,770, filed on Aug. 26, 2011.

(51) Int. Cl.

| | |
|---|---|
| *G06F 15/16* | (2006.01) |
| *G06F 9/44* | (2018.01) |
| *G06F 8/34* | (2018.01) |
| *G06F 8/33* | (2018.01) |
| *G06F 8/40* | (2018.01) |
| *H04L 29/06* | (2006.01) |
| *H04L 29/08* | (2006.01) |
| *G06F 3/0484* | (2013.01) |

(52) U.S. Cl.
CPC .............. *G06F 9/4443* (2013.01); *G06F 8/33* (2013.01); *G06F 8/34* (2013.01); *G06F 8/40* (2013.01); *G06F 3/0484* (2013.01); *H04L 67/02* (2013.01); *H04L 67/10* (2013.01); *H04L 67/28* (2013.01); *H04L 67/42* (2013.01)

(58) Field of Classification Search
CPC ..... H06L 67/10; G06F 9/445; G06F 9/44505; G06F 9/4443
See application file for complete search history.

(56) References Cited

U.S. PATENT DOCUMENTS

| | | | | |
|---|---|---|---|---|
| 6,094,679 | A * | 7/2000 | Teng | G06F 8/61 709/217 |
| 7,523,433 | B1 * | 4/2009 | Anderson | G06F 11/323 707/999.003 |
| 2001/0037490 | A1 * | 11/2001 | Chiang | G06F 8/30 717/106 |

(Continued)

*Primary Examiner* — Richard G Keehn

(57) ABSTRACT

The present invention teaches methods for using a point-and-click interface to allow developers to create visual relationships between APIs and GUI components. Further, the present invention uses interactive machine learning to learn from developer actions. The present invention will assist Developers by providing recommendations on how their application should compile to a target platform. Developers may then configure their app and its connection to APIs (device and remote) directly from the present invention's point-and-click interface. The invention also teaches methods for visual recognition of data structures to allow sections of data to be targeted by a system that matches targeted data to a GUI component. The visual recognition system allows any type of data to move between systems and have required protocols applied at run time instead of during development in the way traditional software works.

1 Claim, 16 Drawing Sheets

(56) References Cited

U.S. PATENT DOCUMENTS

2004/0078190 A1* 4/2004 Fass ................. G06F 17/241
704/7
2005/0132284 A1* 6/2005 Lloyd ................ G06F 17/211
715/236
2005/0182779 A1* 8/2005 Perry ............... G06F 17/30569

* cited by examiner

FIG 13

```
<rdf:RDF  xmlns:rdf="http://www.w3.org/1999/02/22-rdf-syntax-ns#"
xmlns:dc="http://purl.org/dc/elements/1.1/" xmlns:ex="http://
example.org/stuff/1.0/">
  <rdf:Description rdf:about="http://www.w3.org/TR/rdf-syntax-
grammar" dc:title="RDF/XML Syntax Specification (Revised)">
    <ex:editor>
      <rdf:Description ex:fullName="Dave Beckett">
        <ex:homePage rdf:resource="http://purl.org/net/dajobe/" />
      </rdf:Description>
    </ex:editor>
  </rdf:Description>
</rdf:RDF>
```

1300

```
<node attirbute1="VALUE" attribute2="VALUE">         1302
   <node attribute1="VALUE" attribute2="VALUE">
      <node attribute1="VALUE" attribute2="VALUE">
         <node ... >
         </node>
      </node>
   </node>
</node>
```

```
Object(
   node:{
      attirbute1:VALUE,
      attribute2:VALUE,
      node:{
         attribute1:VALUE,
         attribute2:VALUE,
         node:{
            attribute1:VALUE,
            attribute1:VALUE
            node:{
               .....
            }
         }
      }
   }
);
```

1301

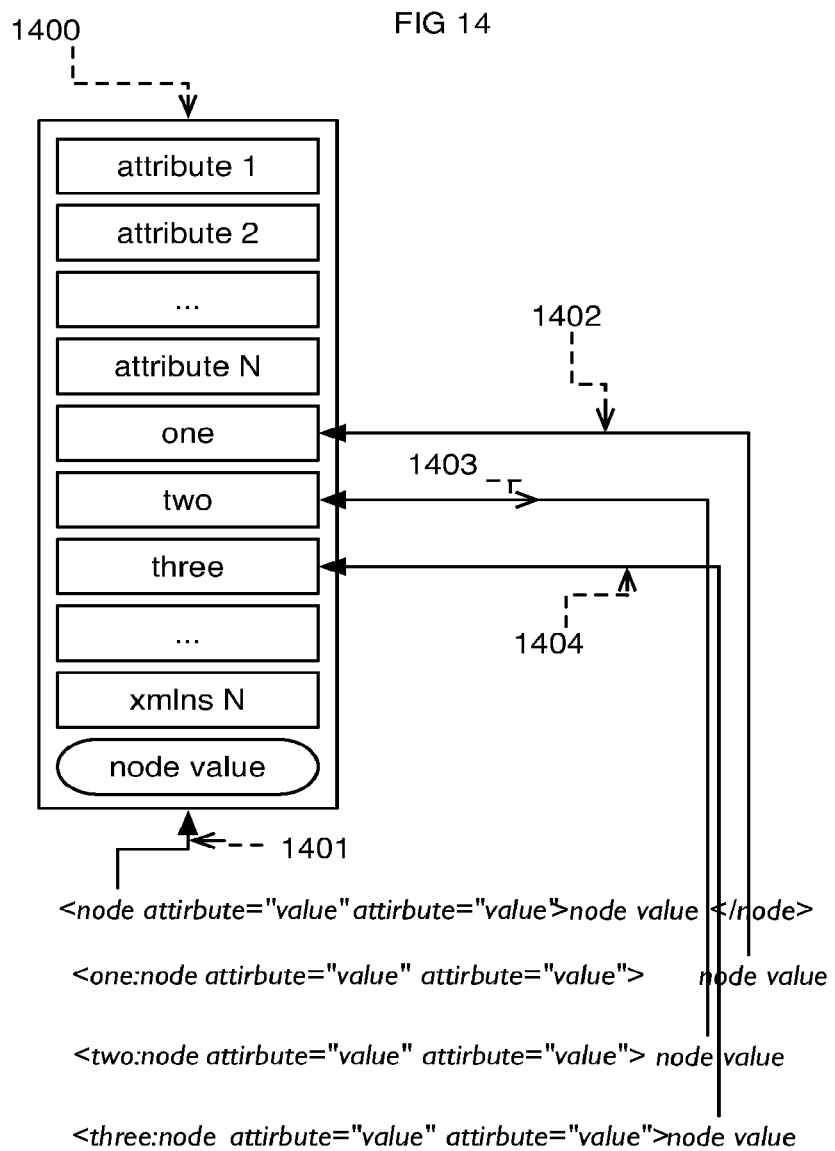

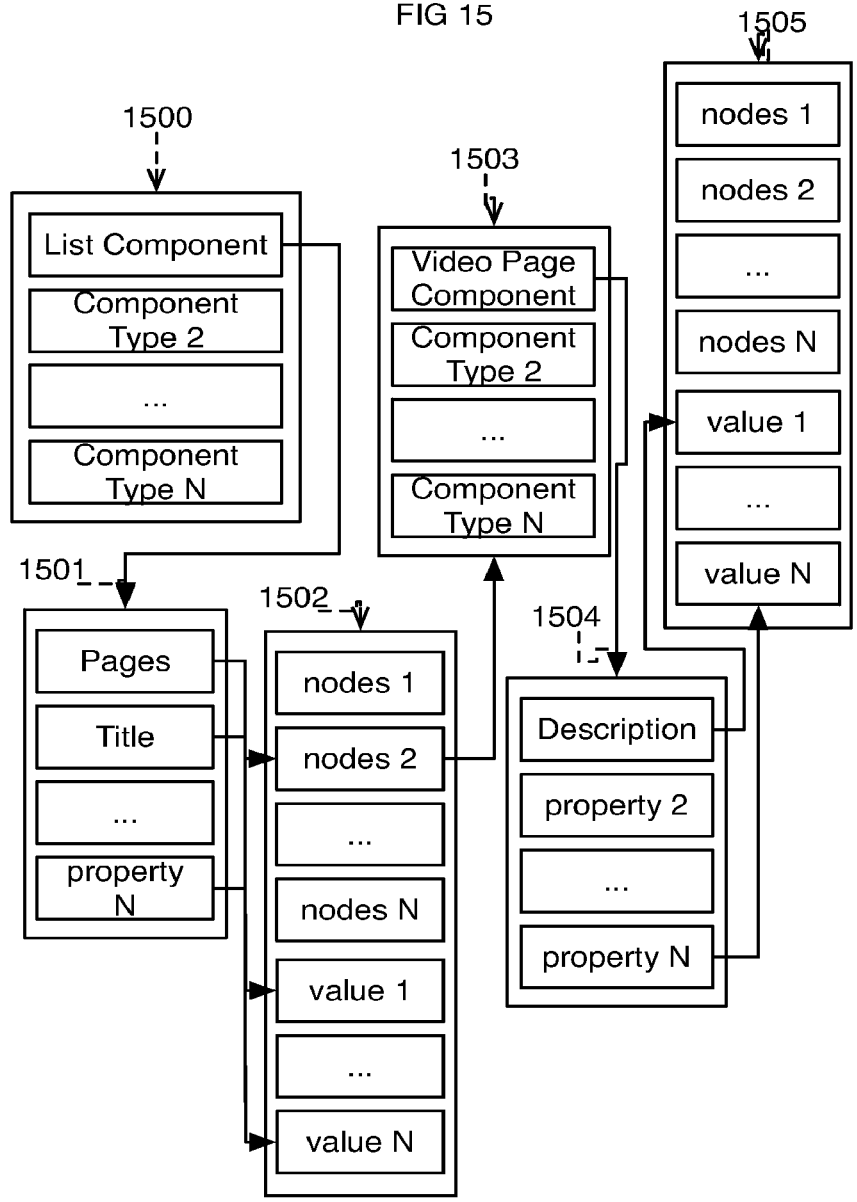

US 10,007,532 B1

DATA INFRASTRUCTURE FOR CROSS-PLATFORM CROSS-DEVICE API INTER-CONNECTIVITY

RELATED APPLICATIONS

The present application claims priority to U.S. patent application Ser. No. 14/347,629 filed Aug. 26, 2011, which claims priority to U.S. Provisional Application No. 61/513,770 filed Aug. 1, 2011, which are both hereby incorporated by reference herein.

FIELD OF INVENTION

The present invention relates to an automated process of adding GUI (Graphic User Interface) components to existing APIs (Application Programing Interface) and future APIs, datasets, documents, web sites, and media.

BACKGROUND OF THE INVENTION

Mobile and desktop software are created with a set of local APIs which perform a series of tasks: complex computation, delivery of device capabilities, algorithms, artificial intelligence and graphic acceleration. Local APIs connect software with hardware. Local software then accesses web-based APIs to connect web services to other web-based APIs. Through this method, data can be accessed by external service providers. Once created, web-based APIs may be scaled in their range of functions and uses by making them available to developers. Developers in turn use web-based APIs to develop a range of functions for websites and mobile software applications.

User access to web-based APIs allows groups or individuals to have a meaningful interaction with data, and because of this, they have become a popular way of distributing services. Web-based companies like Salesforce and Amazon have paved the way for consumer-oriented APIs and companies like Facebook, Skype and Foursquare have introduced social, communication and location-oriented APIs into the mainstream. This trend has been made popular by rapidly advancing smartphone innovations and these innovations have given web-based APIs a portable point of entry. This has been an important development because it has given individuals ready access to the vast range of data and functions APIs can offer.

API popularity among developers has created a change in the tech industry whereby online services have evolved from strictly information and commerce into services which address a range of social and physical data collection. The most secure and efficient way of delivering new services across all connected devices has been through the invention and adaptation of web-based APIs.

The current library of API are increasing exponentially. This increasingly vast API universe and the ability to mix and match functionality has given birth to what is commonly known as a Mashup. Mashups are a way for developers to cherry-pick useful functions from web-based API services. This is because API functions are features of a total software package. For example, Twilio offers telephone services over the web, but these APIs are not meaningful until they are combined with location-based services and customer relationship software. Twilio is a very popular API service for developers, but it only represents a fraction of the kind of APIs that are currently available and might become available in the future.

Web-based APIs also point to a trend in software creation away from the standard software development model. This trend became more apparent when companies like Kinvey, Parse and StackMob moved the database layer of software design into a web-based API service.

In the near future, it is conceivable that all software development will rely less on local APIs and more on web-based APIs. When this happens, all software will be constructed using a combination of functionality delivered via web-based APIs. Eventually, developers will no longer need to build bespoke software. Instead, engineers will program new software functionality into a cloud computer and sell this functionality through an API. With this ecosystem in place, multiple APIs can be combined to create new combinations of useful software.

Evidence of this interconnected software development paradigm can be found on Apple's iCloud service. Currently, this service only supports file contents and device settings between multiple iOS devices, but it is reasonable to infer that Apple has every intention of supporting its own system so that it does a great deal more than it does at present. However, there is no logical reason why this service approach should be restricted to Apple.

Cross-platform compilation is the term given to the compiling of software from a single code base that can then be deployed to multiple platforms or operating systems. To achieve successful cross-platform compilation, it is critical that the machine code produced meets the requirements of the targeted system. This can be a challenging task because of the differences between the existing platform software, hardware and CPU bits. These problems are further complicated when producing games, because the cross-platform compiler must also account for graphics processing.

The set of devices running a specific platform (iOS, Android, etc.) has multiple operating system versions, different hardware, and different screen sizes. This raises a problem for which two common solutions have emerged. The first solution is to embed a web browser in a native wrapper which allows developers to program applications using HTML, Javascript, and CSS. The second solution is to use a cross-compilation IDE that allow developers to compile apps to multiple platforms and devices. The former is more scalable and easier to use, while the latter delivers to fewer platforms, but produces higher performance applications.

The problem of cross-platform display differences & usability implementations has pushed developers to target a single platform. Many companies have tried to build universal tools for developers that allow them to build once and deploy to all platforms. The complexity of an ever-growing number of operating systems, the operating system versions and OEM modified versions fragment the market to the point where cross-compilation becomes a futile task. Many cross-compilers have gone out of business, while others continue to struggle to deliver applications to 2 or 3 different operating systems. The best of breed in this class, Mono and PhoneGap, have managed this task more thoroughly than any of their predecessors and competitors. Still, they only fully support 4 platforms. As the number of platforms they support grows, so does their code base, making their software difficult to scale. Handling incoming data, executing on it, and making it meaningful without needing custom code, is nearly impossible.

SUMMARY OF INVENTION

The present invention seeks to solve this cross-platform compilation trade-off by using interactive machine learning to learn from developer actions. The present invention will further assist developers by providing recommendations on how their application should compile to a target platform.

To address the problems and limitations noted above, a method for using a point and click UI to allow developers to create visual relationships between APIs and GUI components is provided. Developers may then configure their app and its connection to APIs (device and remote) directly from the present invention's point and click UI.

According to a preferred embodiment, the learning machine of the present invention will preferably use a customized Bayesian method to target developer configurations for standardization, and to evaluate application logs. These two streams of evidence will preferably allow the learning machine to estimate accurately its own confidence level that a targeted configuration should be released.

The present invention is a universal platform to connect APIs and combine them into meaningful software. Without programming, it can accelerate these trends in software development. The present invention does this by providing a Taught Data Translator (TDT) to developers. According to the present invention, the TDT is a point-and-click interface that allows developers to place data in designated containers for display. According to a further aspect, the present invention uses a skeleton component architecture which allows developers to fill with meaningful data by building visual relationships between the components and the incoming data. Generality is maintained by teaching the TDT what the data means, instead of assuming the data follows a standardized format. The presentation invention preferably uses learning algorithms instead of code customizations to scale the TDT across all data types.

According to a further aspect, the present invention preferably will use TDT along with a Taught Platform Compiler (TPC) to compile native applications. The TPC will allow developers to teach applications how to connect to device APIs for a targeted platform. Developers will register device APIs and configure the connections directly from the present invention. Thereafter, those device APIs may then become available for use in the developer's application. Further in accordance with the present invention, the TPC will preferably learn from developer configurations and adapt to deliver the ideal implementations for every platform.

The present invention is preferably configured as a lightweight wireframe wrapper that connects native usability and performance to any API. Applications built with the present invention will preferably scale and remain functional across all devices. Even in less capable WAP browsers, the applications using the present invention can function as basic websites.

According to a further aspect of the present invention, algorithms are provided to automate the following processes for developers: remote communications, data handling, REST API creation, GUI creation, and cross platform deployment.

Preferably, the present invention is a code-less environment so no code is downloaded or executed at run time. The skeleton architecture of the present invention preferably allows it to be configured Just In Time using a Natural Machine Language (NML) document. NML documents are simple text files (XML) that can be securely downloaded to any device. There is nothing executable in a NML document so it brings no harm to the device it is stored on. With the present invention, the application update lifecycle for any mobile app is: use point and click UI to update app configuration, push update to users and then the updated app goes live. With a point-and-click editor, software created using the present invention can easily be updated for new services as they are added.

The object of the present invention is to overcome the shortcomings disclosed in the prior art. The accompanying drawings, which are incorporated in and constitute part of the specification, illustrate various embodiments of the present invention and together with the description, serve to explain the principles of the present invention.

BRIEF DESCRIPTION OF THE DRAWINGS

FIG. 13 shows how three popular data formats have similar hierarchies.

FIG. 14 shows how any data can be visualized based on its hierarchy.

FIG. 15 shows the flow for application creation using ClickSlide.

DETAILED DESCRIPTION OF THE INVENTION

According to the present invention, interactive machine learning algorithms are provided which are designed to learn from developer actions. Based on specific data, the algorithms of the present invention will provide recommendations on how their application should compile to a target platform. According to a preferred embodiment, the present invention preferably consists of three parts: a Point and Click UI, a Device API wrapper and a learning machine.

The point and click UI may allow developers to create visual relationships between APIs and GUI components. Developers may configure their app and its connection to APIs (device and remote) directly from the point and click UI.

The device API wrapper is preferably a custom lightweight, performance-optimized wrapper, which connects directly to device and remote APIs. Preferably, the wrapper scales easily because it uses Natural Machine Language (NML) to adapt to APIs as they evolve.

Figure 1:
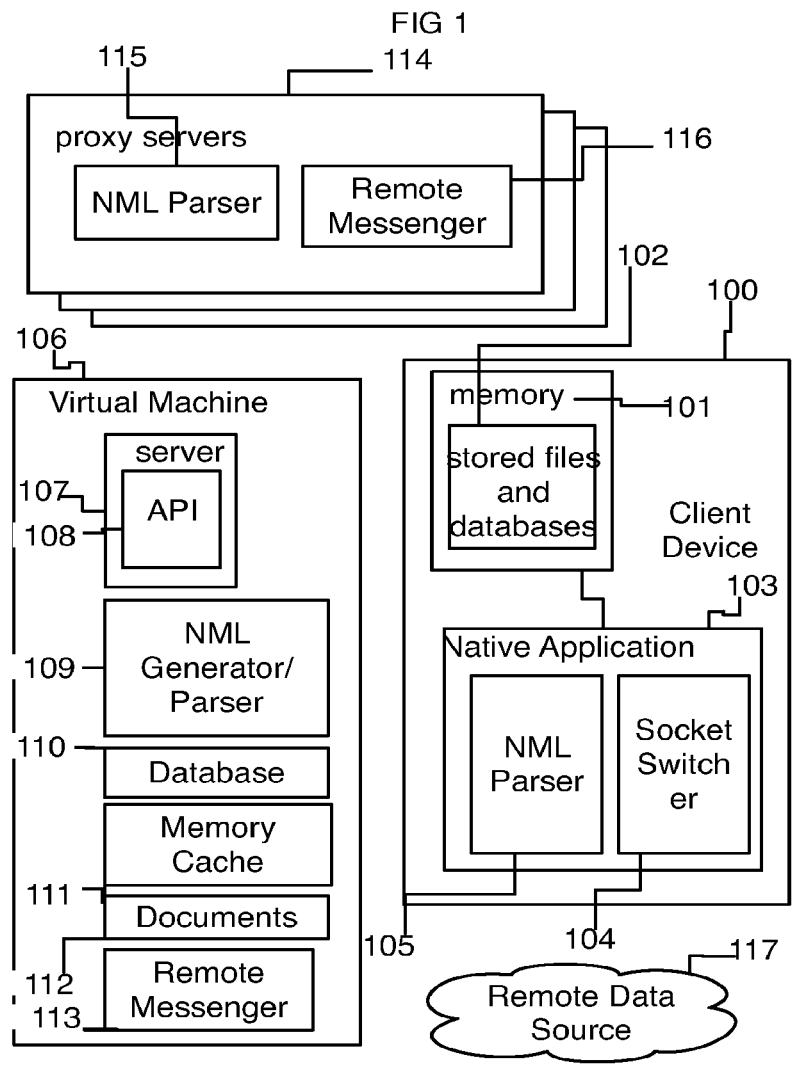
FIG. 1 shows a flowchart diagram of how data flows system-wide.

FIG. 1, an exemplary flowchart diagram of how data flows system-wide, will now be discussed. As shown in FIG. 1, an embedded version of ClickSlide components 100: Taught Data Compiler, Socket Switcher, and Skeleton GUI Architecture. The GUI framework runs on a device and parses small Natural Machine Language (NML) files. When the files are parsed, remote data connection information is extracted and the GUI framework asynchronously reaches out to ClickSlide web servers and compiles all static data for the application. Any GUI configuration that requires on-demand asynchronous communication will connect to ClickSlide web servers upon user interaction. Preferably, this GUI framework consists of all necessary GUI components for any type of application. It also may contain a Socket Switcher for persistent connections to remote server directly from the application.

As further shown in FIG. 1, a client device is an internet connected device such as a smart phone, television, refrigerator, etc. 100. A memory bank 101 in the device 100. Files and databases 102 created by the application 103 are stored in memory 101. A native application 103 running on the client device 100. A socket switcher 104 that manages socket connections between the native application 103 and proxy protocol servers 1015. An NML parser 105 coded in the native language of the client device 100 that matches NML tags to their related GUI components for display. The NML is delivered through a socket 104, stored on the device 102, and transported between the native application 103 and a web server 107. A virtual computing environment 106 that scales the size of its infrastructure automatically to the needs of the system running on it. A web server 107 running on a virtual machine 106. A software layer (API) 108 that allows for remote communications to remote client devices 100. A system that generates NML 109 from developer input that is then sent to a remote client device 100 and parsed in a native application 103. A database 1010 that stores user information for the web server 107. A memory cache to store NML files used for communication between remote applications 103 and a web server 107. Historical documents 1012 saved by the NML generator 109. A remote messenger 1013 that accepts requests from the NML generator 109 and manages authentication and connection to all remote data sources 1017. Servers that convert NML to data 1014 of a specific protocol for delivery to remote client devices 100. An NML parser 1015 extracts the data to convert and the remote data source information from the incoming NML sent from the remote messenger 1013. An embedded remote messenger 1016 (the same as 1013 except embedded in an application 103) used for all remote communication and sockets for the proxy server. A remote data source 1017.

Figure 2:
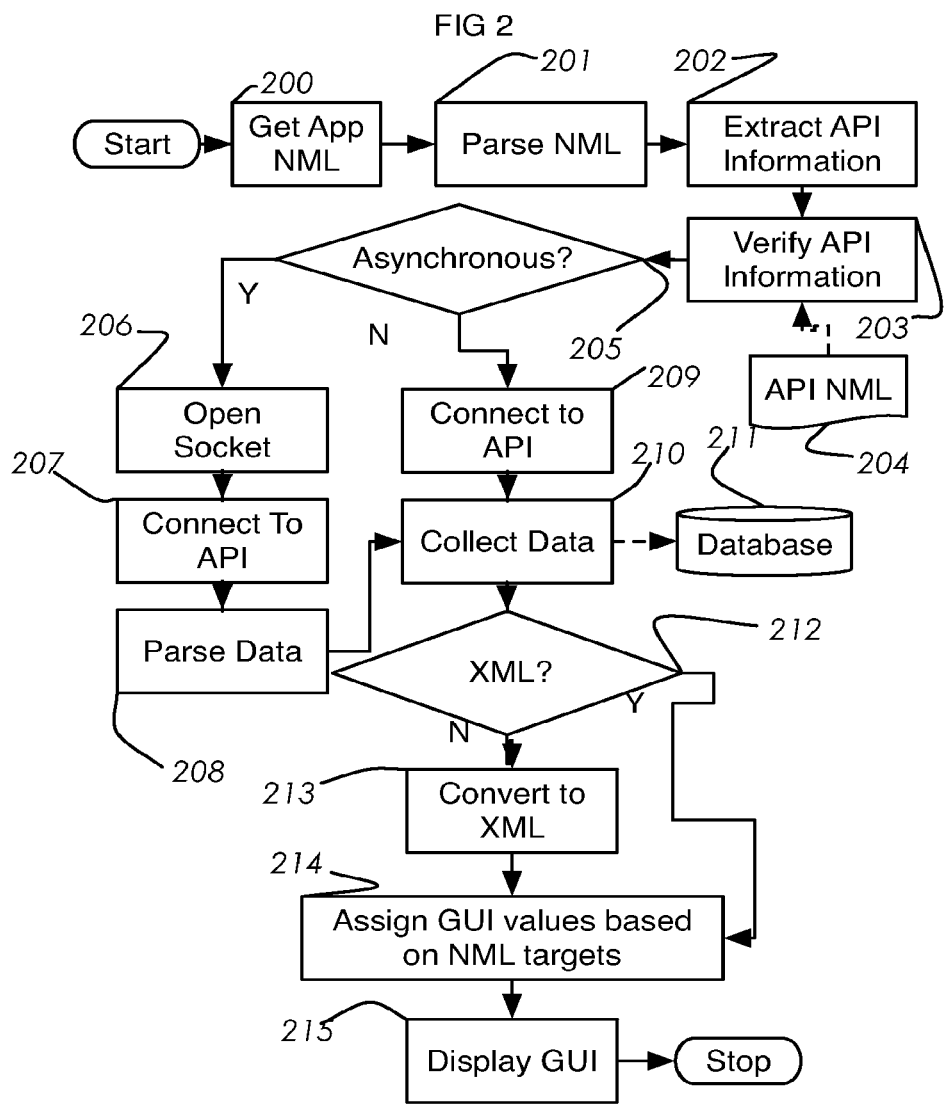
FIG. 2 shows a flowchart diagram of the method in which the system pulls the NML from the local database and converts it to XML and assigns GUI values based on NML targets.

With reference now to FIG. 2, this is a flowchart diagram of the method in which the system pulls the NML from the local database, converts it to XML and assigns GUI values based on NML targets. The system pulls the NML from a local database 201. The system parses the NML to extract remote data source information 202. All relevant remote data source (API) information is extracted from the document. That API data extracted are references to full API data sets in the database. Those full data sets are then pulled from a database of NML files 204 and the system configures itself to connect successfully to the API 203. The API data taken from the files is automatically verified when the system attempts to retrieve full data sets from the database 205. Is the connection synchronous or asynchronous 206? Synchronous communication is when only one message can be sent at a time. During synchronous communication a message sits in queue until the response from the last message is returned. In asynchronous communication, all messages can be sent one after another without interruption and the system handles the responses as they come in. A socket from the client application is opened to prepare a persistent connection to the remote data source 207. The socket makes a persistent connection with the remote data source 208 and the incoming data is parsed 209. The system connects synchronously to the remote source 210 and then collects all data returned from the remote data source. That data is then stored in a database 211. Preferably, the data may be stored on a database on a local server 212. The system will then evaluate if the data is returned from the remote data source as an XML protocol 213. If the data is not XML, it is converted to XML 214. Data targeted by the NML is assigned to the GUI component based on the structure outlined in the NML document 215. The GUI is displayed by the system 216.

Figure 3:
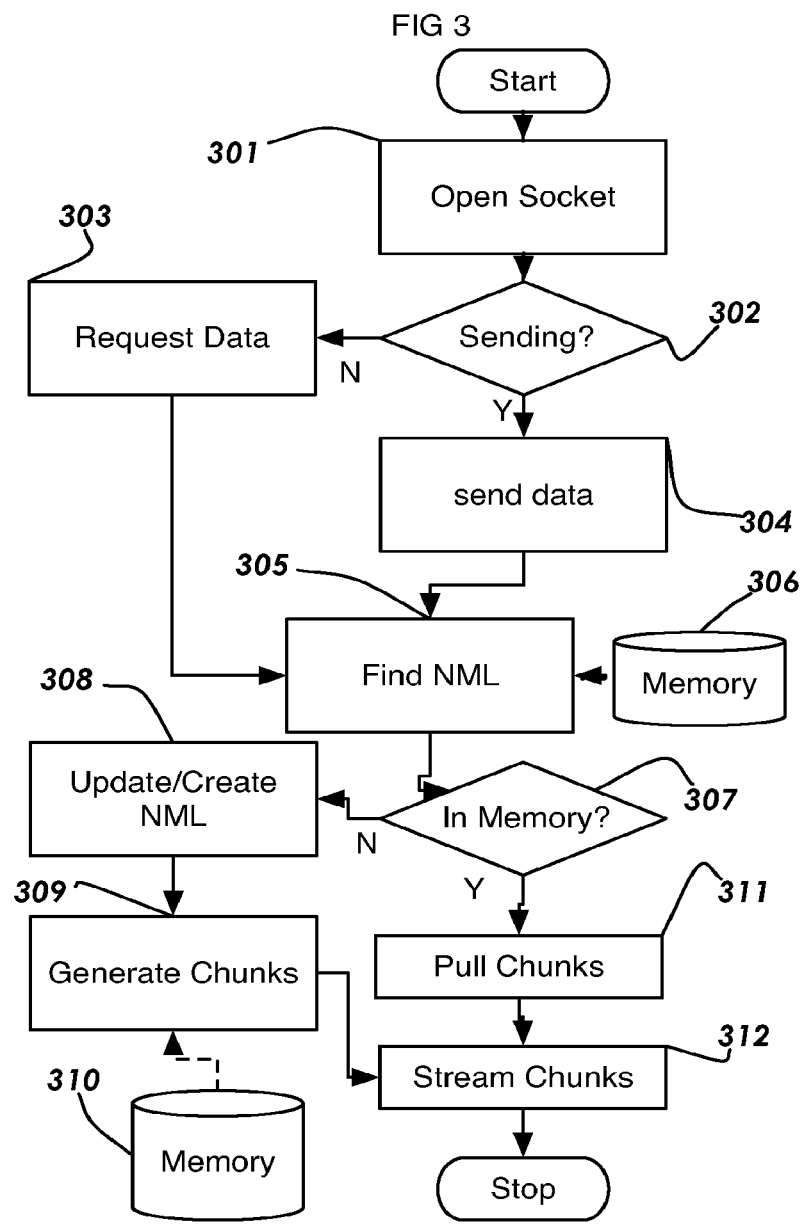
FIG. 3 shows a flowchart diagram describing a persistent socket connection with a local server when it is opened to generate chunks of data to stream back to the requesting application or the Micro-Chunk Transfer Protocol.

FIG. 3, a flowchart diagram describing a persistent socket, will now be discussed. Connection with a local server is opened to generate chunks of data to stream back to the requesting application or the Micro-Chunk Transfer Protocol. As shown in FIG. 3, a persistent socket connection with a local server is opened 301 and the system evaluates whether or not the socket is sending or receiving data 302. Then a request for data is sent to the server 303 and the Socket sends a stream of data to the server 304. The server attempts to find NML already associated with the requested/sent data 305. In the Persistent Memory that stores cached NML and data documents for rapid retrieval 306, the system evaluates whether or not there is already a document in memory 307. If there is nothing in memory for this data set, create the NML for the data 308 and chunks of data are generated to stream back to the requesting application 309. If the Persistent Memory store of cached chunks 310, the system will evaluate if there is already a document in memory and then pull all the chunks from memory 311. The data chunks may be streamed back to the server in rapid-fire succession 312.

Figure 4:
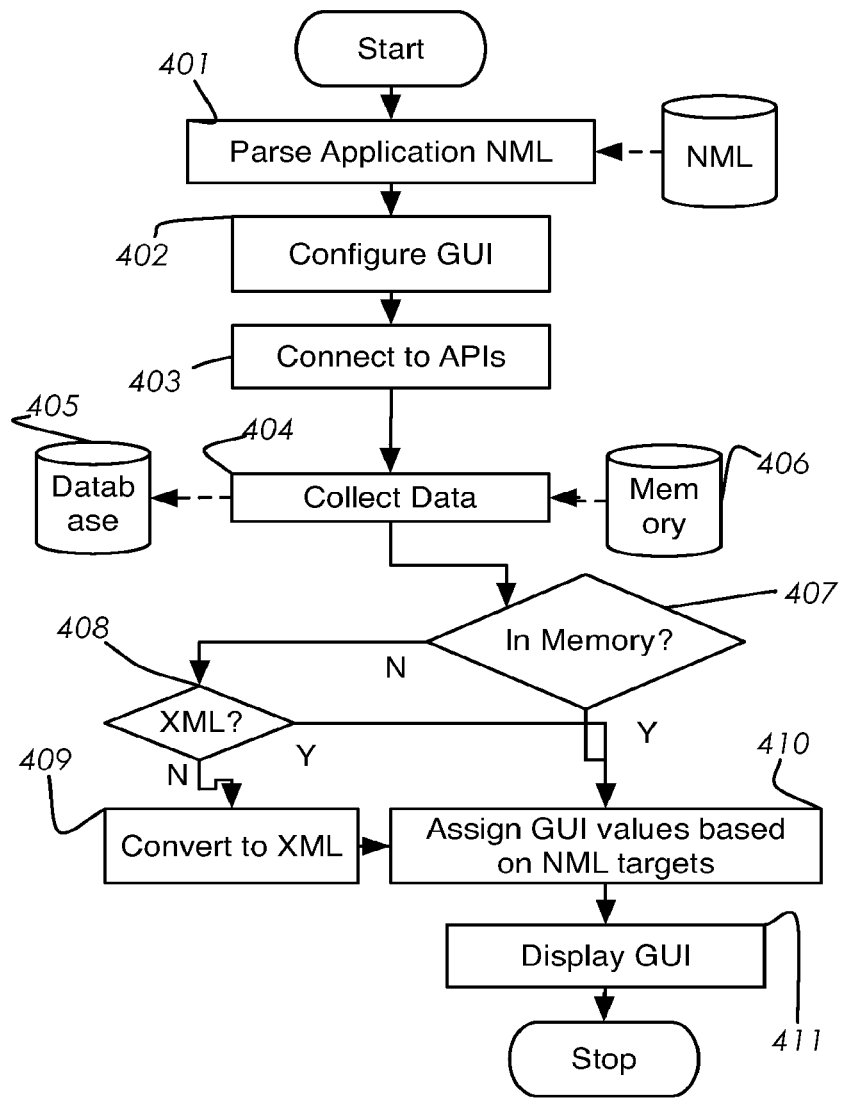
FIG. 4 shows a flowchart diagram describing how an application goes from a simple NML document and is displayed as an application GUI.

FIG. 4 is a flowchart diagram describing how an application goes from a simple NML document and is displayed as an application GUI and will now be discussed. As shown in FIG. 4, the application NML that resides on the device is parsed. The necessary GUI components are configured based on the NML description 402. This includes preparing the GUI components for data injection and display. It also involves extracting the remote data connection information. The GUI components are connected to the remote data source using the developer credentials 403. All data is collected from the remote source and prepared for transformation and NML targeting 404. The data is sent to a database on a local server 405. In the Persistent Memory storage of current NML documents 406, the system may evaluate whether there is a document already in memory 407 and whether the document is XML 408? If not, convert the document to XML 409. Data targeted by the NML is assigned to the GUI component based on the structure outlined in the NML document 410 and the GUI is displayed 411.

Figure 5:
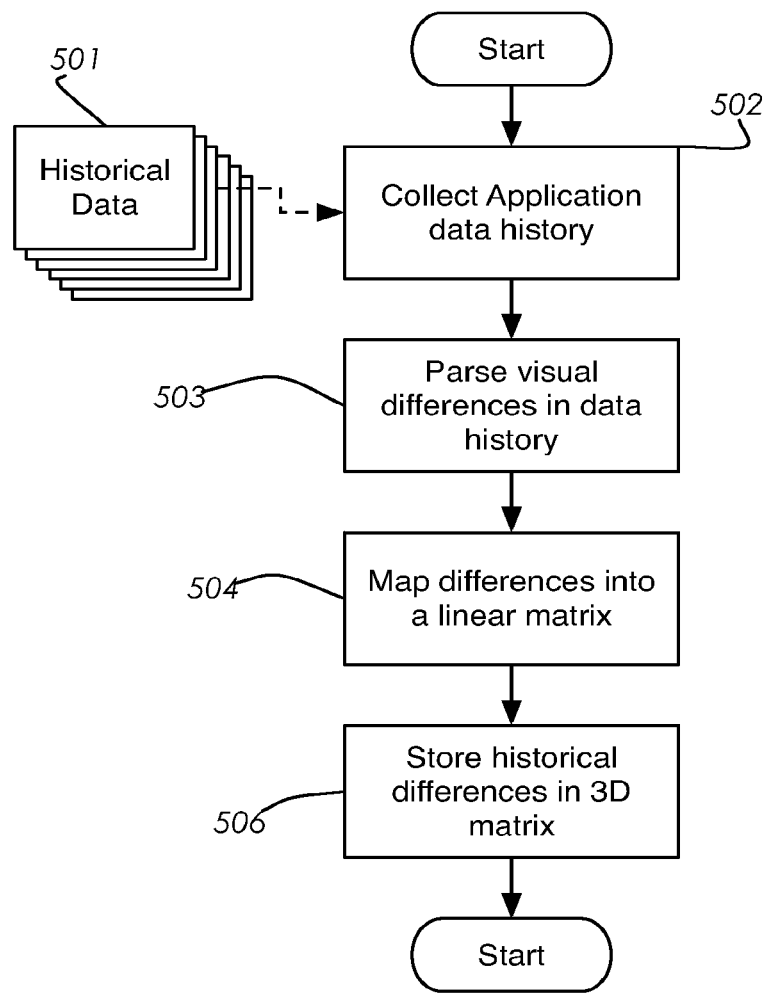
FIG. 5 shows a flowchart displaying the conversion from a data document to a linear matrix grid of points.

FIG. 5, a flowchart diagram displaying the conversion from a data document to a linear matrix grid of points, will now be discussed. As shown in FIG. 5, a database of previous versions of data used in the application 501 is formed from data gathered from the historical documents for the application 502. The documents are visually compared to find differences in the most current 503 and the differences are mapped into a linear matrix 504. Since every document represents a layer in a physical space, the data can be treated as physical objects. The multi-dimensional linear matrix of data changes is stored in a database 505.

Figure 6:
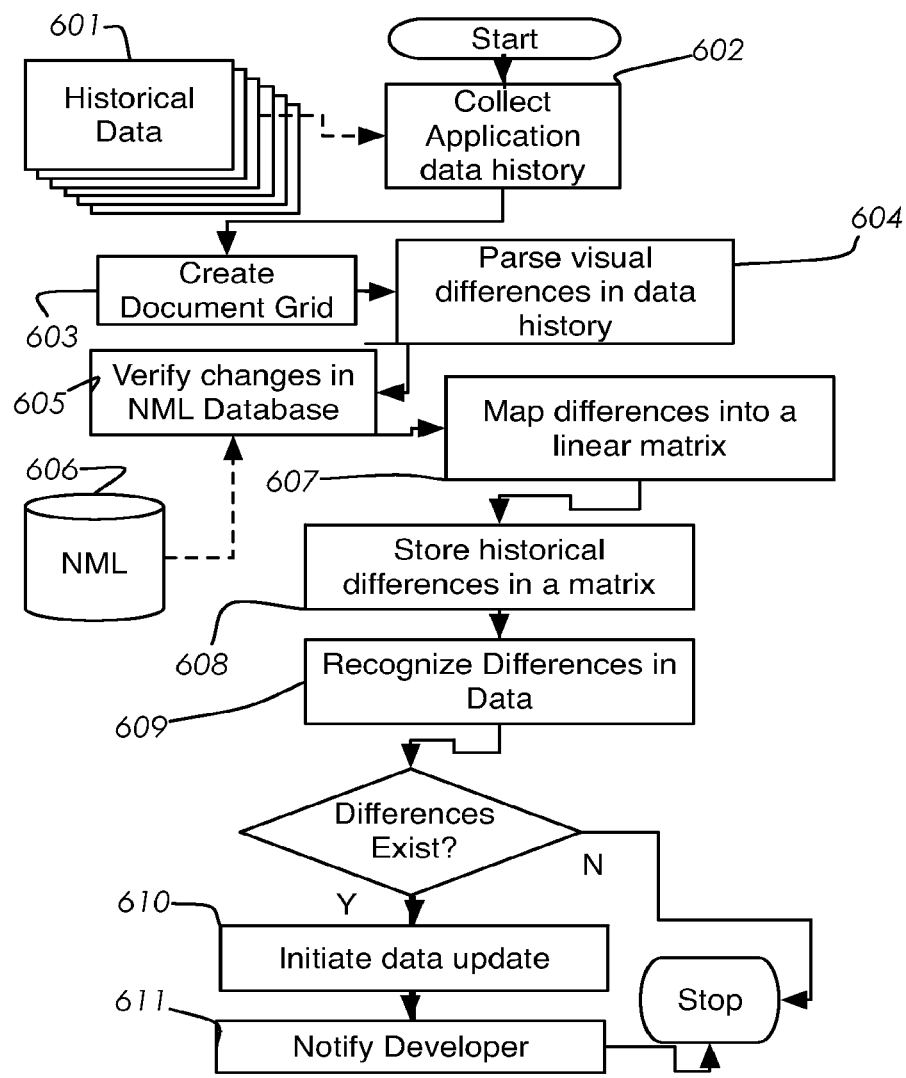
FIG. 6 shows a flowchart diagram outlining the invention used to discover differences in historical data documents in relation to a data source and its most recent document.

FIG. 6, a flowchart diagram outlining the invention used to discover differences in historical data documents in relation to a data source and its most recent document, will now be discussed. As shown in FIG. 6a, a database of previous versions of data used in the application 601 and the historical documents for the application are gathered 602. A linear matrix grid for the documents is generated 603 and the visual differences in data history are parsed by viewing all documents in history overlaid by each other 604. The system can then use visual recognition to target points of difference. The changes, if any, are verified to be new by validating the differences against the most current document 605 and stored in an NML database 606. All differences in the documents are mapped to a multi-dimensional grid known as a Matrix 607. Points in the Matrix represent all differences in the documents. One document represents a dimensional layer in the Matrix. So, if 5 documents are being compared, a 5D Matrix is created to track all differences in those 5 documents. After the Matrix is saved 608, Visual Pattern Recognition technology is used to recognize the differences in the Matrix 609. Data is updated where needed as found by the Matrix 610 and the developer is notified of any changes 611.

Figure 7:
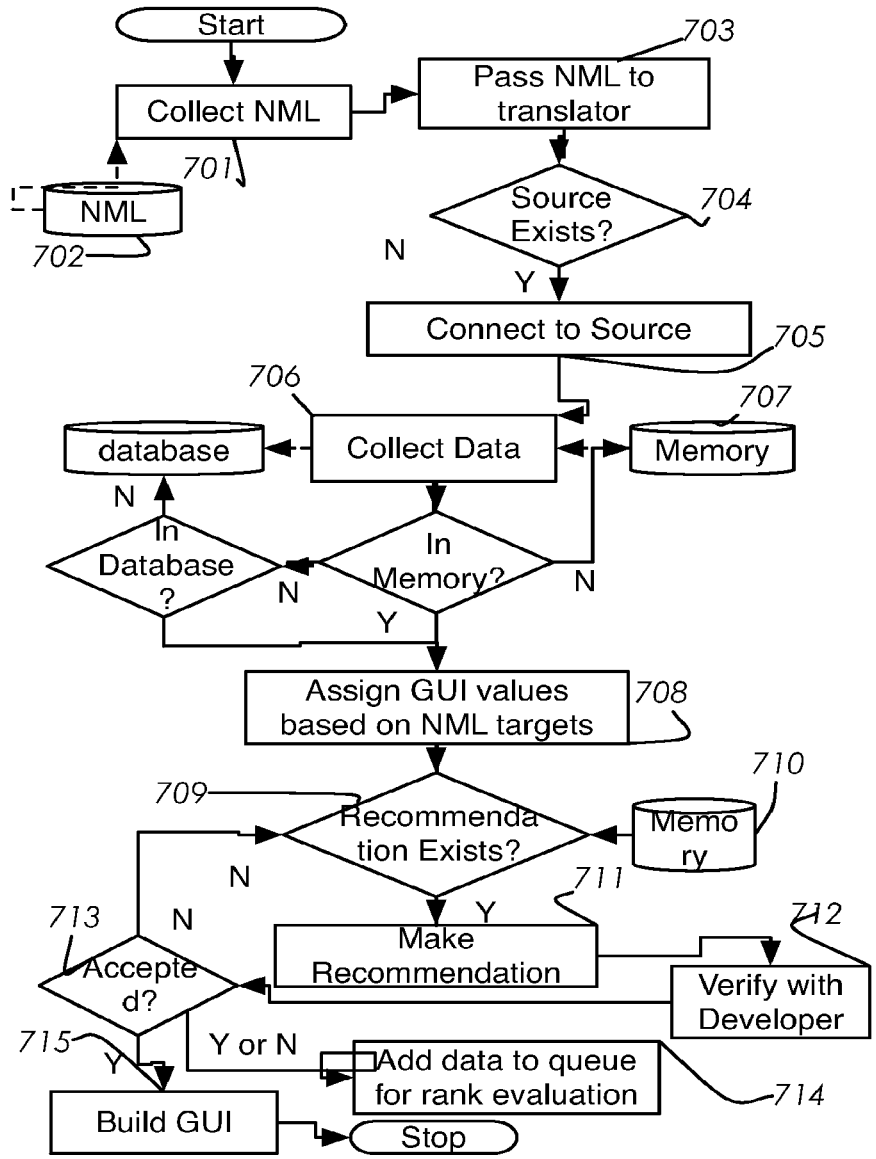
FIG. 7 shows a flowchart diagram outlining the development process when NML data is processed on behalf of the user and makes a connection to a remote data source.

FIG. 7, a flowchart diagram outlining the development process when NML data is processed on behalf of the used and makes a connection to a remote data source, will now be discussed. As shown in FIG. 7, NML is gathered 701 from NML database 702 and the NML is passed onto the Taught Data Translator 703. The system will evaluate whether or not the NML connects to a remote data source 704. If it does connect to the remote data source 705, then all data is collected 706 from the Persistent Memory storage 707. Data targeted by the NML is assigned to the GUI component based on the structure outlined in the NML document 708. If the system can make a recommendation 709 based off data stored in the Persistent Memory storages 710, then a recommendation is made to the developer based on a custom mathematical algorithm 711. Learning machines learn what developers build and suggest the best components to the developer depending on popularity, lack of errors, overall use system wide, and a number of other variables and constants. The recommendation is verified with the Developer 712. If the developer accepts the recommendation 713, the recommendation is added to queue for rank evaluation so the system learning machines can parse it and readjust its rank 714 and the system continues to build the GUI 715.

Figure 8:
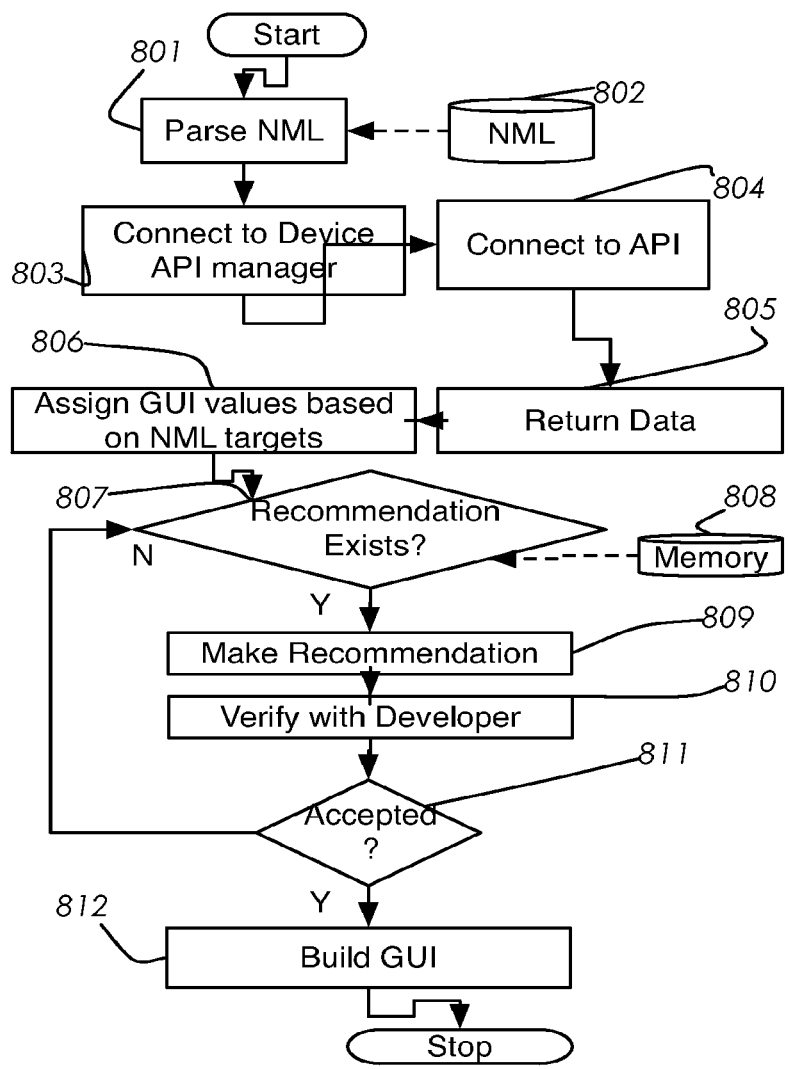
FIG. 8 shows a flowchart diagram representing a part of the development process where learning machines make recommendations to developers about the best GUI to use for their application.

FIG. 8, a flowchart diagram representing a part of the development process where learning machines make recommendations to developers about the best GUI to use for their application, will now be discussed. As shown in FIG. 8, the NML is parsed to extract device API and remote data connection information 801 from the NML database 802. The Device API Manager is connected to validate the device API information 803 and the device APIs as defined by the NML are connected 804. The data from device API is returned to Device API Manager 805. The data targeted by the NML is assigned to the GUI component based on the structure outlined in the NML document 806. The system evaluated may then make a recommendation 807 based on data from the Persistent Memory storage 808. If it can, than a recommendation is made to the developer based on a custom algorithm 809. Learning machines learn what developers build and suggest the best components to the developer depending on popularity, lack of errors, overall use system-wide, and a number of other variables and constants. The recommendation is verified with the Developer 811. If the developer accepts the recommendation 812, than the Recommendation is added to queue for rank evaluation 813 and the system continues to build the GUI 814.

Figure 9:
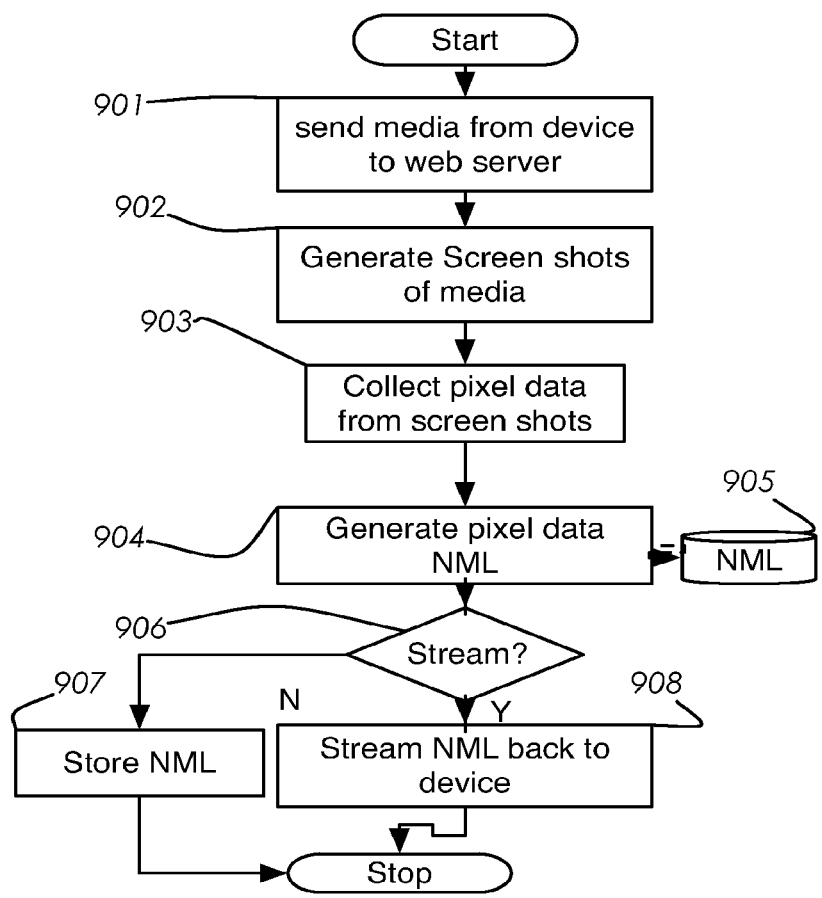
FIG. 9 shows a flowchart diagram describing Pixel Data Transformer to collect and parse the pixel data to generate NML tags for every pixel in a screen shot to create a matrix which can be stored or streamed.

FIG. 9, a flowchart diagram describing Pixel Data Transformer to collect and parse the pixel data to generate NML tags for every pixel in a screen shot to create a matrix which can be stored or streamed, will now be discussed. As shown in FIG. 9, media from the device is sent to a web server 901 to generate screen shots of the media 902. If it is a video, it will generate screen shots for every frame. Pixel data is collected from every screen shot 903. The pixel data is parsed and generates NML tags for every pixel of the screen shot 904 from the NMP database 905. Pixels are treated by the system as a physical space on the screen. The system targets the physical space the pixel takes up as opposed to simply reading its pixel value. A grid is drawn over the screen which is the system's frame of reference. If the medium is video, than a multi-dimensional matrix is created to store all the pixel data. In this matrix, a screen shot is one dimension and a pixel is a grid point in that dimension of the matrix. If the media does not need to be streamed back to the requesting application, than the generated NML is stored for later use 907. If the media needs to be streamed back to the requesting application, than the NML is streamed back to the application 908.

Figure 10:
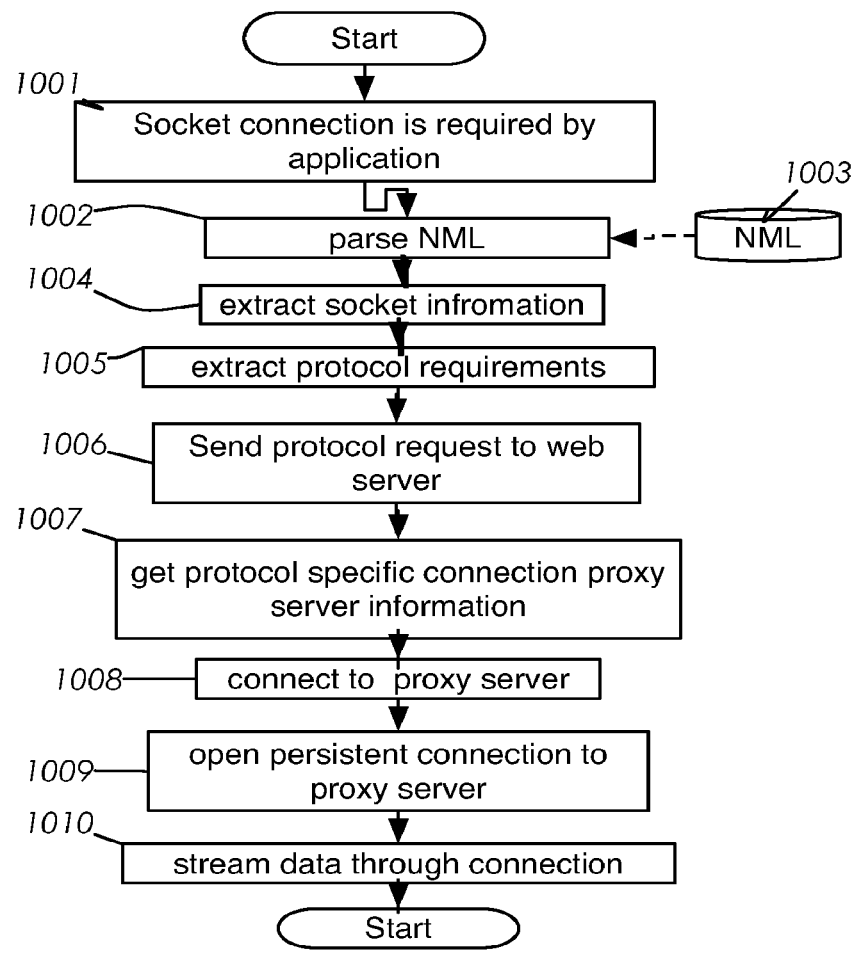
FIG. 10 shows a flowchart diagram outlining the flow of data from an application through a socket to a proxy protocol server which in turn makes connects to a remote data source on behalf of the requesting application.

FIG. 10, a flowchart diagram outlining the flow of data from an application through the methods outlined in FIG. 1, will now be discussed. As shown in FIG. 10, a socket connection is required by the application based on the API information in the NML database 1001. The application NML is parsed 1002 from the NML database 1003. All socket information is extracted from the NML 1004 and all protocol information is extracted 1005. A protocol request is sent to the web server 1006 and the web server returns information regarding the proxy server the application can connect to in order to use the requested protocol 1007. The application is connected to proxy server 1008. A persistent socket is opened in the connection with the proxy server 1009 and data is streamed 1010 through the connection.

Figure 11:
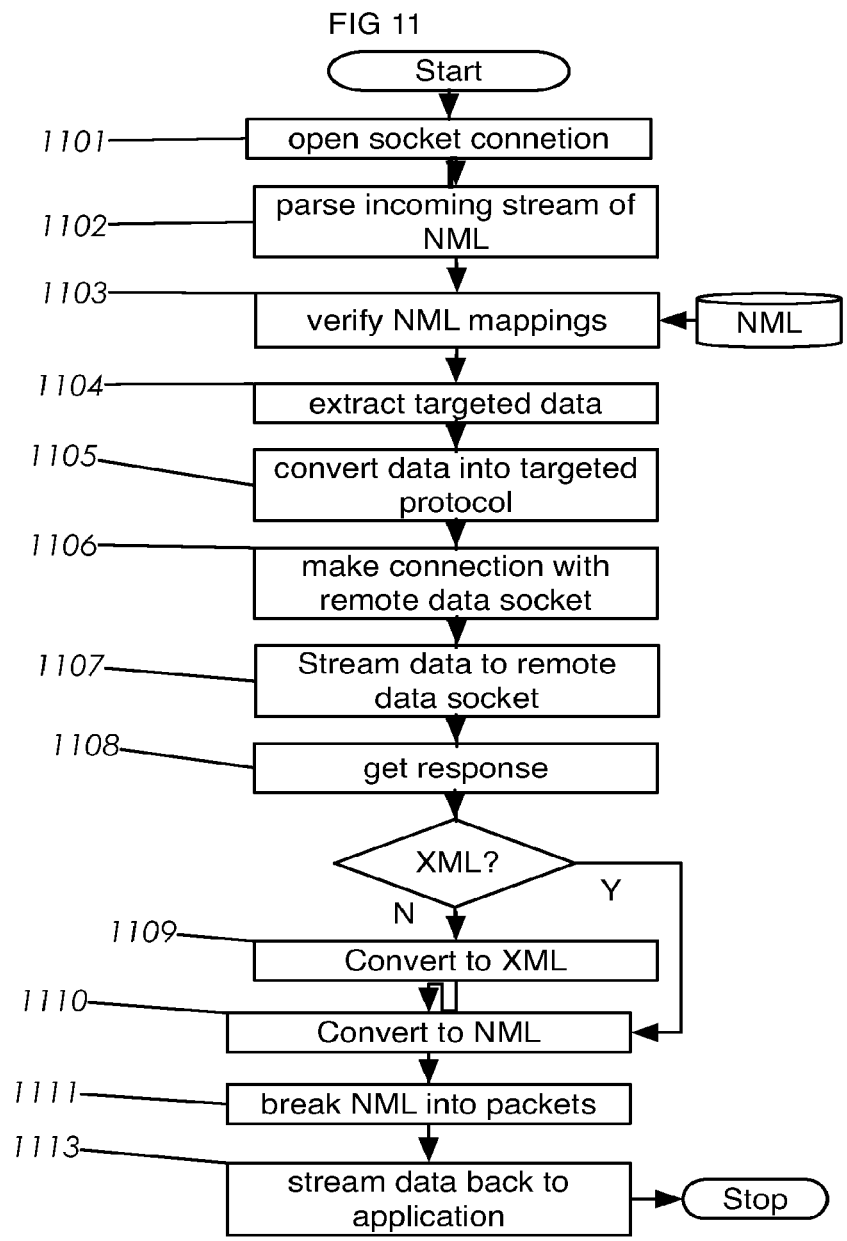
FIG. 11 shows a flowchart diagram outlining the flow of data within a proxy protocol server as it communicates with remote data sources.

FIG. 11, a flowchart diagram outlining a preferred method as outlined in FIG. 1, will now be discussed. As shown in FIG. 11, a persistent socket is opened 1101 and the incoming data stream of NML is parsed 1102. The data streaming from the NML is verified against a database 1103 and the targeted information is extracted 1104. The targeted data is converted into a proxy server specific protocol 1105 and a connection is made with a remote data socket 1106. Data is streamed through the remote data socket 1107 and a response stream is received back from the remote data socket 1108. The response data is converted to XML 1109. The XML is converted to NML based on NML data configuration 1110 and the NML is split into individual tags as packets which are then compressed 1111. The compressed packets are streamed back to the application one at a time in rapid file succession 1112.

Figure 12:
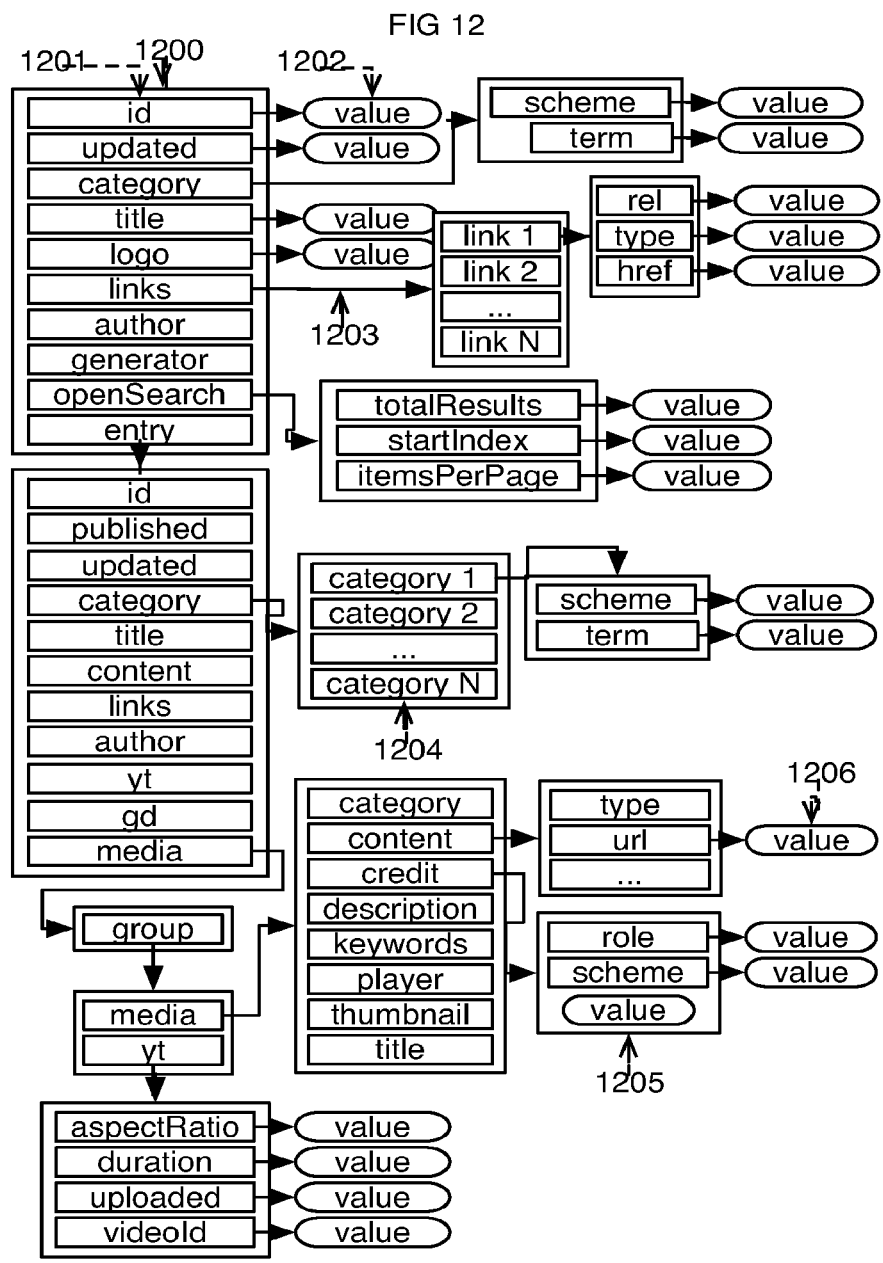
FIG. 12 shows a data source visualized based on its hierarchy.

With reference now to FIG. 12, API data visualized based on its hierarchy, will now be discussed. As shown in FIG. 12, a representation of a GUI list 1200 is populated with either an XML tag name or a tag's attribute 1201. A value taken from the ID tag 1202 is assigned to each tag or tag attribute. As further shown in FIG. 12, a transition from a list to another list or from a list to a list item's value 1203 is indicated by the arrow. If the list item leads to a value and not another list, then the item will be displayed as a selectable object such as a button or check box. Multiple category tags are combined into a list of their own 1204. Each category tag then leads to a list of its attributes and its value. An example of a list of attributes and only one value 1205 is shown here. The value item will display as a selectable object such as a button or check box. Another example of a value of an attribute or XML tag 1206.

FIG. 13, comparing three popular data formats having similar hierarchies, will now be discussed. As shown in FIG. 13, there is: RDF, a format for open data based on XML 1300; a generic object 1301, a type of Object is similar to a PHP Object or even a JSON Object, and a generic XML format 1302.

With reference now to FIG. 14, a list depicting how any data can be visualized based on its hierarchy will now be discussed. As shown, data for the list 1400 is preferably taken from the designated tags 1401-1404. Accordingly, as shown, data in the example list 1400 may be taken as shown from tag 1401, one: tag 1402, two: tag 1403, and further from three: tag 1404.

FIG. 15, the flow for application creation using Click-Slide, will now be discussed. As shown in FIG. 15, the developer would create a List in ClickSlide where each list item would lead to a display page. This process creates an API mapping file. First the developer chooses the component type, in this case a List 1500. The developer then maps each of the List's properties to a value 1501. This shows a list of available data values. This step is repeated until all properties are mapped to a value. A list of values is taken from a data source 1502. A choice of display components is used to display the data for each list item 1503. This step is only necessary when creating a list, such as a list of properties for the display component 1504. Each property will need to be mapped to a value. A list of values is taken from a data source 1505.

Figure 16:
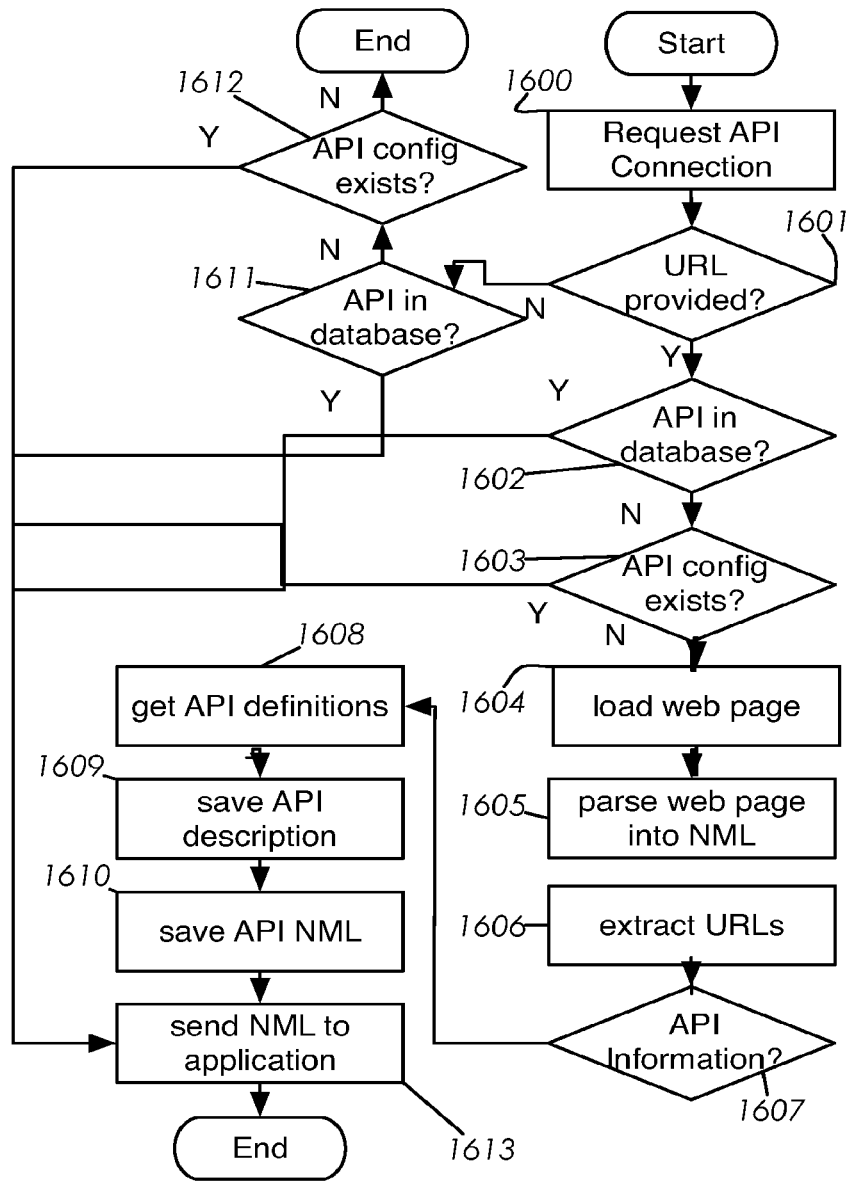
FIG. 16 shows a workflow diagram that shows how ADRS-API handles a request to search a domain.

FIG. 16, an Automatic Discovery of Remote Services and APIs (ADRS-API), will now be discussed. An Automatic Discovery of Remote Services and APIs (ADRS-API) is an API definition search engine. As shown in FIG. 16, a workflow diagram shows how ADRS-API handles a request to search a domain. An application requests an API connection 1600. Check if the request contains a URL for the API 1601. Check if the request API is described in the database 1602. Check for an API definition file 1603. Load the web page from the URL 1604. Crawl the page 1605. Extract all URLs related to the API or that have the same domain name 1606. Check for API method and method parameter references on the page 1607. Extract API definition from the page 1608. Save the descriptions in the database 1609. Save the definitions to an API definition file 1610. Check if the request API is described in the database 1611. Check for an API definition file 1612. Send the configuration to the requesting Application 1613.

While the above descriptions regarding the present invention contain much specificity, these should not be construed as limitations on the scope, but rather as examples.

We claim:

1. A method of providing interconnectivity between operating systems and for supplying modified data to a requesting application using Natural Machine Language (NML) file tags, the method comprising:

detecting the launch of a requesting user application within a client system;

parsing an NML file associated with the detected application;

retrieving data connection information from the parsed NML file;

analyzing the retrieved data connection information;

determining from the retrieved data connection information whether to connect to a web server via HTTP protocol or a persistent socket connection;

establishing a direct request with the web server using an HTTP protocol based on the retrieved data connection information;

establishing a connection to a remote data service based on remote data connection authentication information and requesting data;

providing requested data to the requesting web server and converting the received data to XML format based on the hierarchy and identified visual targets within the data;

extracting target data from the received data and placing the target data in a client accessible NML file tag;

sending the NML file tag to the requesting user application; and parsing the NML file tag, extracting data and displaying the data in a GUI component assigned to the user accessible NML file tag.

* * * * *